United States Patent
Hass

(10) Patent No.: US 10,924,358 B1
(45) Date of Patent: Feb. 16, 2021

(54) METHOD AND SYSTEM FOR MULTIVARIATE PROFILE-BASED HOST OPERATIONAL STATE CLASSIFICATION

(71) Applicant: Dell Products L.P., Hopkinton, MA (US)

(72) Inventor: Jon Robert Hass, Austin, TX (US)

(73) Assignee: Dell Products L.P., Hopkinton, MA (US)

(*) Notice: Subject to any disclaimer, the term of this patent is extended or adjusted under 35 U.S.C. 154(b) by 0 days.

(21) Appl. No.: 16/594,915

(22) Filed: Oct. 7, 2019

(51) Int. Cl.
*H04L 12/26* (2006.01)
*H04L 12/24* (2006.01)
*H04L 29/08* (2006.01)
*G06N 5/04* (2006.01)

(52) U.S. Cl.
CPC .......... *H04L 41/16* (2013.01); *G06N 5/04* (2013.01); *H04L 67/1008* (2013.01); *H04L 67/30* (2013.01)

(58) Field of Classification Search
CPC ..... H04L 41/16; H04L 67/30; H04L 67/1008; G06N 5/04

USPC ......................................................... 709/224
See application file for complete search history.

(56) References Cited

U.S. PATENT DOCUMENTS

| | | | | |
|---|---|---|---|---|
| 2008/0285575 | A1* | 11/2008 | Biswas | H04L 41/0246 370/401 |
| 2015/0236935 | A1* | 8/2015 | Bassett | H04L 43/18 709/224 |
| 2018/0359184 | A1* | 12/2018 | Inbaraj | H04Q 9/00 |

\* cited by examiner

*Primary Examiner* — Tu T Nguyen
(74) *Attorney, Agent, or Firm* — Chamberlain, Hrdlicka, White, Williams & Aughtry

(57) ABSTRACT

A method and system for multivariate profile-based host operational state classification. Specifically, the disclosed method and system entail the generation of non-geometric shapes derived from operational state inferring features reflective of at least a portion of host device telemetry aggregated for host devices. The non-geometric shapes may subsequently be mapped onto a high-dimensional feature space and, thereafter, assigned into clusters representative of given target operational states that may be exhibited by the host devices. Based on identified operational states, assigned to the non-geometric shapes, reactive actions may be invoked to address or rectify operations and/or configurations on the host devices.

20 Claims, 10 Drawing Sheets

US 10,924,358 B1

METHOD AND SYSTEM FOR MULTIVARIATE PROFILE-BASED HOST OPERATIONAL STATE CLASSIFICATION

BACKGROUND

Automating the analysis and identification of the operational states of complex information technology equipment, infrastructure, and system is a complex problem in itself and is being made even more complex by the staggering amount of telemetry becoming available for hardware and software workload infrastructure.

SUMMARY

In general, in one aspect, the invention relates to a method for operational state classification of host devices. The method includes loading a feature space including a set of cluster-representative objects, deriving a first state profile from host device telemetry for a first host device, mapping the first state profile onto the feature space, to obtain a first mapped state profile, identifying a first cluster-representative object of the set of cluster-representative objects based on a first set of proximities between the first mapped state profile and the set of cluster-representative objects, associating, with the first state profile, a first host operational state assigned to the first cluster-representative object, and invoking, based on the first host operational state, a first reactive action targeting the first host device.

In general, in one aspect, the invention relates to a non-transitory computer readable medium (CRM). The non-transitory CRM includes computer readable program code, which when executed by a computer processor, enables the computer processor to load a feature space including a set of cluster-representative objects, derive a first state profile from host device telemetry for a first host device, map the first state profile onto the feature space, to obtain a first mapped state profile, identify a first cluster-representative object of the set of cluster-representative objects based on a first set of proximities between the first mapped state profile and the set of cluster-representative objects, associate, with the first state profile, a first host operational state assigned to the first cluster-representative object, and invoke, based on the first host operational state, a first reactive action targeting the first host device.

In general, in one aspect, the invention relates to a system. The system includes a telemetry analytics service including a computer processor configured to load a feature space including a set of cluster-representative objects, derive a state profile from host device telemetry for a host device, map the state profile onto the feature space, to obtain a mapped state profile, identify a cluster-representative object of the set of cluster-representative objects based on a set of proximities between the mapped state profile and the set of cluster-representative objects, associate, with the state profile, a host operational state assigned to the cluster-representative object, and invoke, based on the host operational state, a reactive action targeting the host device.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for multivariate profile-based host operational state classification. Specifically, one or more embodiments of the invention entail the generation of non-geometric shapes derived from operational state inferring features reflective of at least a portion of host device telemetry aggregated for host devices. The non-geometric shapes may subsequently be mapped onto a high-dimensional feature space and, thereafter, assigned into clusters representative of given target operational states that may be exhibited by the host devices. Based on identified operational states, assigned to the non-geometric shapes, reactive actions may be invoked to address or rectify operations and/or configurations on the host devices.

Figure 1:
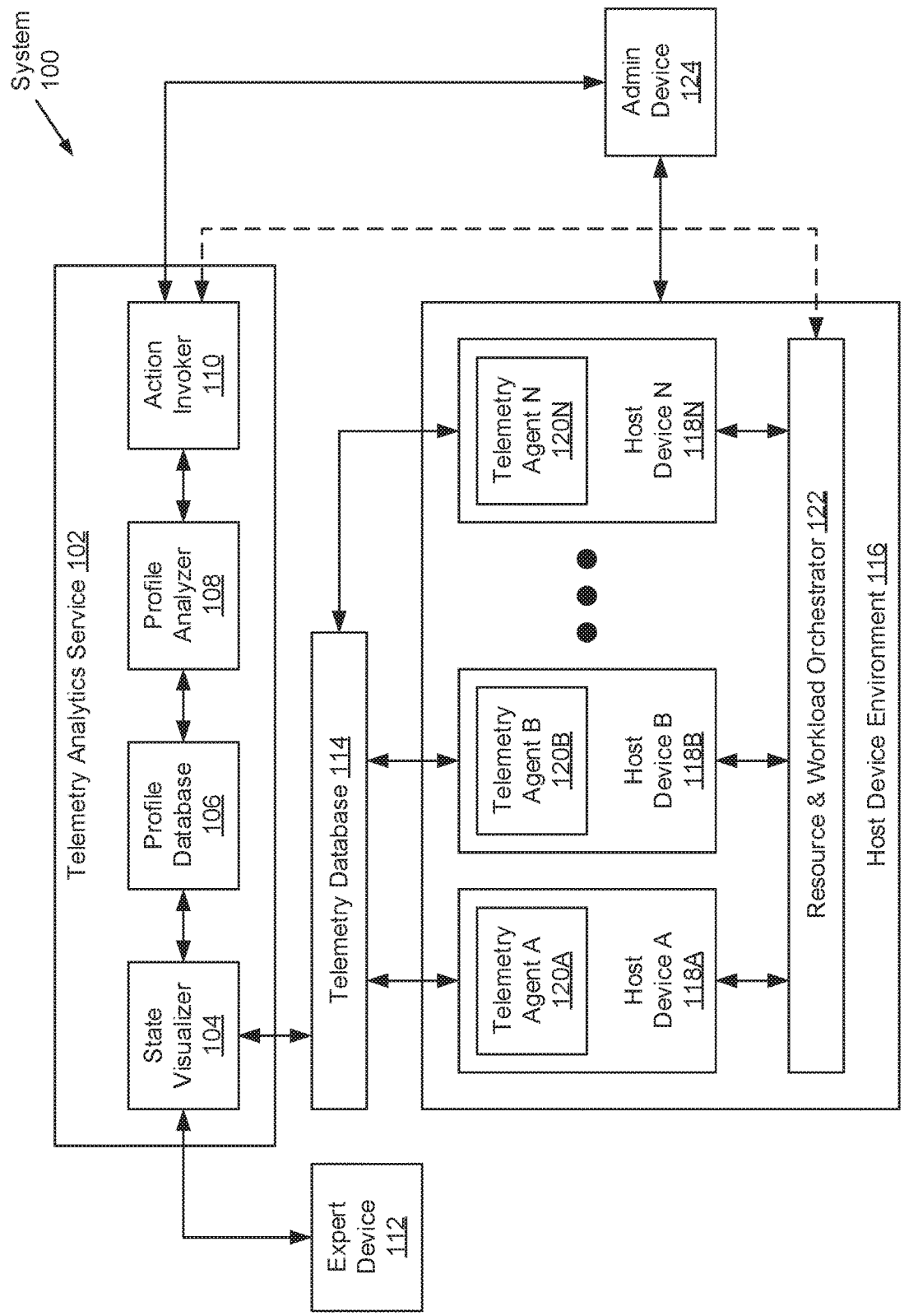
FIG. 1 shows a system in accordance with one or more embodiments of the invention.

FIG. 1 shows a system in accordance with one or more embodiments of the invention. The system (100) may include a telemetry analytics service (102), an expert device (112), a telemetry database (114), a host device environment (116), and an admin device (124). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled components (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the telemetry analytics service (102) may represent a performance tracking and operations guiding service for datacenter and/or cloud computing environments. Specifically, the telemetry analytics service (102) may be designed and configured to employ data mining and/or machine learning techniques directed to host (i.e., host device) operational state classification. To that extent, the telemetry analytics service (102) may include functionality to process host device telemetry (see e.g., FIGS. 3A and 3B), render host device state profiles (see e.g., FIG. 4), optimize a clustering model (see e.g., FIG. 5), validate the clustering model (see e.g., FIG. 6), and classify host operational states (see e.g., FIG. 7). One of ordinary skill will appreciate that the telemetry analytics service (102) may perform other functionalities without departing from the scope of the invention.

In one embodiment of the invention, the telemetry analytics service (102) may be implemented using one or more servers (not shown). Each server may be a physical server, which may reside in a datacenter, or a virtual server, which may reside in a cloud computing environment. Additionally or alternatively, the telemetry analytics service (102) may be implemented using one or more computing systems similar to the exemplary computing system shown in FIG. 8. Furthermore, the telemetry analytics service (102) may include a state visualizer (104), a profile database (106), a profile analyzer (108), and an action invoker (110). Each of these telemetry analytics service (102) subcomponents is described below.

In one embodiment of the invention, the state visualizer (104) may refer to a computer program that may execute on the underlying hardware of the telemetry analytics service (102). Specifically, the state visualizer (104) may be designed and configured (with or without human intervention) to visualize or render host device operational state profiles (also referred to as state profiles) (described below) (see e.g., FIG. 2B). Should the visualization of state profiles, at least in part, require human intervention, the state visualizer (104) may include functionality to publish a graphical user interface (GUI) and/or application programming interface (API) through which a user (e.g., a subject matter expert (SME)), while operating the expert device (112), may provide inputs pertinent to the visualization process. The state visualizer (104) may include further functionality to: retrieve host device telemetry from the telemetry database (114); derive state profiles from the retrieved host device telemetry; associate the derived state profiles with target host operational states; and store the derived state profiles and target host operational states as key-value pairs within the profile database (106). One of ordinary skill will appreciate that the state visualizer (104) may perform other functionalities without departing from the scope of the invention.

In one embodiment of the invention, the profile database (106) may refer to a data repository dedicated to storing key-value pairs. Each key-value pair may refer to an associative relationship mapping a given key to a given value. More specifically, the given key of a given key-value pair may take the form of a state profile (described below) (see e.g., FIG. 2B) derived for a given host device based on host device telemetry collected at a given time. On the other hand, the given value (if available) of the given key-value pair may take the form of a target host operational state—i.e., a numerical or categorical value reflecting an operational state (e.g., normal, high memory utilization, high CPU temperature, high power consumption, any combination thereof, etc.) of the given host device, which may be ascertained from or relative to the host device telemetry collected at the given time. In one embodiment of the invention, at least a portion of the key-value pairs, stored in the profile database (106), may not specify a value. In such an embodiment, any value-less key-value pair may be subjected to host operational state classification using an optimized clustering model (described below), whereas the complete key-value pairs may be used train and/or validate the clustering model. Moreover, in one embodiment of the invention, the profile database (106) may additionally store host device metadata with each key-value pair. The host device metadata may include, for example, identification information—e.g., a unique name, a unique media access control (MAC) address, a unique Internet Protocol (IP) address, etc.—assigned to a given host device with which the key-value pair may be associated.

In one embodiment of the invention, the profile database (106) may be implemented using one or more physical storage devices (not shown). The physical storage device(s) may or may not be of the same type or co-located in a same server, at least in part, implementing the telemetry analytics service (102). Each physical storage device may encompass non-transitory computer readable storage media on which data may be stored in whole or in part, temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) based storage devices. Moreover, in one embodiment of the invention, any subset or all physical storage device(s) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the profile analyzer (108) may refer to a computer program that may execute on the underlying hardware of the telemetry analytics service (102). Specifically, the profile analyzer (108) may be designed and configured to best-estimate (or predict) the operational state of a given host device based on a state profile for the given host device in conjunction with clustering model classification. To that extent, the profile analyzer (108) may include functionality to: retrieve complete key-value pairs from the profile database (106); train and/or validate a clustering model using the retrieved complete key-value pairs, to obtain an optimized clustering model; retrieve value-less key-value pairs from the profile database (106); determine the respective values (i.e., host operational states) of the retrieved value-less key-value pairs using the optimized clustering model; update the retrieved value-less key-value pairs, stored in the profile database (106), with the determined respective values; and provide the determined respective host operational states, for given host devices, to the action invoker (110). One of ordinary skill will appreciate that the profile analyzer (108) may perform other functionalities without departing from the scope of the invention.

In one embodiment of the invention, the action invoker (110) may refer to a computer program that may execute on the underlying hardware of the telemetry analytics service (102). Specifically, the action invoker (110) may be designed and configured to perform one or more reactive actions based on the predicted classification of host device telemetry for any given host device that may have been aggregated at any given point-in-time. To that extent, the action invoker (110) may include functionality to: obtain predicted host operational states, respective to given host devices, from the profile analyzer (108); compare the obtained, predicted host operational states against, for example, a set of prescribed heuristics (i.e., rules); and issue notifications, alerts, and/or recommendations based, at least in part, on the set of prescribed heuristics. One of ordinary skill will appreciate that the action invoker (110) may perform other functionalities without departing from the scope of the invention.

In one embodiment of the invention, a reactive action may entail issuing a notification and/or an alert, indicative of the predicted host operational state associated with the given host device, to the resource and workload orchestrator (122) (described below) and/or the admin device (124). In another embodiment of the invention, a reactive action may entail issuing a recommendation, addressing or rectifying the predicted host operational state associated with the given host device, to the resource and workload orchestrator (122) and/or the admin device (124). In the latter embodiment, the recommendation may entail: (a) the changing of one or more operational and/or configuration parameters governing the behavior of the given host device; (b) the shifting of one or more workloads to be instantiated onto the given host device from one or more other host devices, or workloads to be offloaded from the given host device to one or more other host devices; and (c) the allocation or deallocation of resources (e.g., computer processors, memory, storage, virtualization, network bandwidth, etc.) available on the given host device in support of one or more existing workloads executing thereon. Moreover, to address or rectify the predicted host operational state associated with the given host device, the objective of a given recommendation may be directed to returning (if feasible) the real-time operational state of the given host device to a host operational state nearest, if not matching, a normal or nominal operational state.

In one embodiment of the invention, the expert device (112) may represent any physical computing system operated by one or more subject matter experts (SMEs). A SME may refer to an individual or entity whom may possess special skills or knowledge on a particular topic—i.e., host device telemetry and the various host device operational states that may be derived therefrom. Through the expert device (112), the SME(s) may interact with the telemetry analytics service (102) (or more specifically, the state visualizer (104)) to assist in the visualization of state profiles (described below) (see e.g., FIG. 2B) based on selective host device telemetry. Accordingly, the expert device (112) may include functionality to convey SME inputs, pertinent to the visualization process, by way of a graphical user interface (GUI) and/or application programming interface (API) published by the state visualizer (104). One of ordinary skill will appreciate that the expert device (112) may perform other functionalities without departing from the scope of the invention. Examples of the expert device (112) may include, but are not limited to, a desktop computer, a laptop computer, a tablet computer, a server, a smailphone, or any other computing system similar to the exemplary computing system shown in FIG. 8.

In one embodiment of the invention, the telemetry database (114) may refer to a data repository dedicated to storing host device telemetry. Host device telemetry may refer to a collection of metrics, logs, and/or events descriptive of at least the real-time status, configuration, and performance of one or more host devices (118A-118N) (described below). The telemetry database (114) may be designed and configured to aggregate, and subsequently consolidate, host device telemetry from one or more telemetry agents (120A-120N) (described below) residing on the host device(s) (118A-118N), which may be received therefrom periodically. Examples of host device telemetry may include, but are not limited to, central processing unit (CPU) utilization percentage, memory utilization percentage, memory bus activity, power consumption, network interface card (NIC) port bytes received and/or transmitted, storage device input-output (IO) per second (IOPS), storage device available capacity, system airflow throughput, and number of idle CPU cores.

In one embodiment of the invention, the telemetry database (114) may be implemented using one or more servers (not shown). Each server may be a physical server residing in a datacenter, or a virtual server residing in a cloud computing environment. Additionally or alternatively, the telemetry database (114) may be implemented using one or more computing systems similar to the exemplary computing system shown in FIG. 8. Furthermore, the aforementioned server(s) may include or operatively connect to one or more physical storage devices (not shown). The physical storage device(s) may or may not be of the same type or co-located in a same server, at least in part, implementing the telemetry database (114). Each physical storage device may encompass non-transitory computer readable storage media on which data may be stored in whole or in part, temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) based storage devices. Moreover, in one embodiment of the invention, any subset or all physical storage device(s) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the host device environment (116) may refer to datacenter and/or cloud computing infrastructure—i.e., a configuration of various information technology components (e.g., servers, storage, networking, management, etc.). More specifically, the host device environment (116) may include, but is not limited to, one or more host devices (118A-118N) operatively connected to a resource and workload orchestrator (122). Each of these host device environment (116) subcomponents is described below.

In one embodiment of the invention, a host device (118A-118N) may represent any physical appliance or computing system designed and configured to receive, generate, process, store, and/or transmit data, as well as to provide an execution environment in which one or more computer programs (and their respective workloads) may execute thereon. The computer programs may, for example, implement large-scale and complex data processing; or implement one or more services offered locally or over a network. Further, in providing an execution environment for any computer programs installed thereon, a host device (118A-118N) may include and allocate various resources (e.g., computer processors, memory, storage, virtualization, network bandwidth, etc.), as needed, to the computer programs and the workloads (e.g., tasks, processes, etc.) instantiated thereby. One of ordinary skill will appreciate that a host device (118A-118N) may perform other functionalities without departing from the scope of the invention. Examples of a host device (118A-118N) may include, but are not limited to, a desktop computer, a laptop computer, a workstation computer, a server, a mainframe, or any other computing system similar to the exemplary computing system shown in FIG. 8.

In one embodiment of the invention, each host device (118A-118N) may include a telemetry agent (120A-120N) residing thereon. A telemetry agent (120A-120N) may refer to a computer program that may execute on the underlying hardware of a respective host device (118A-118N). Specifically, a telemetry agent (120A-120N) may be designed and configured to collect one or more indicators representative of host device telemetry (described above) for a respective host device (118A-118N). To that extent, a telemetry agent (120A-120N) may include functionality to periodically prompt one or more physical and/or logical sensors (not shown), installed throughout a respective host device (118A-118N), to collect the aforementioned indicator(s); and transmit the indicator(s), once aggregated for a given time, to the telemetry database (114) for consolidation. One of ordinary skill will appreciate that a telemetry agent (120A-120N) may perform other functionalities without departing from the scope of the invention.

In one embodiment of the invention, the resource and workload orchestrator (122) may refer to a physical appliance or computing system, a computer program executing on a physical appliance or computing system, or a combination thereof. Further, the resource and workload orchestrator (122) may be designed and configured to distribute and/or balance workloads across the host device(s) (118A-118N) of the host device environment (116). The resource and workload orchestrator (122) may also be designed and configured to allocate and deallocate host device (118A-118N) resources—e.g., computer processors, memory, storage, virtualization, network bandwidth, etc.—as needed to support the various workloads instantiated throughout the host device environment (116). In one embodiment of the invention, the resource and workload orchestrator (122) may include functionality to: receive notifications, alerts, and/or recommendations from the telemetry analytics service (102) (or more specifically, the action invoker (110)); receive commands and/or instructions from the admin device (124); and, accordingly, coordinate the allocation/deallocation of resources on the host device(s) (118A-118N) and/or the distribution/balance of workloads across the host device environment (116) based on the received notifications, alerts, recommendations, commands, and/or instructions. One of ordinary skill will appreciate that the resource and workload orchestrator (122) may perform other functionalities without departing from the scope of the invention. Examples of the resource and workload orchestrator (122) may include, but are not limited to, a desktop computer, a workstation computer, a laptop computer, a server, a mainframe, any other computing system similar to the exemplary computing system shown in FIG. 8, a computer program executing on any of the aforementioned exemplary devices, or any combination thereof.

In one embodiment of the invention, the admin device (124) may represent any physical computing system operated by one or more administrators of the host device environment (116). An administrator of the host device environment (116) may refer to an individual or entity whom may be responsible for overseeing host device environment (116) operations and maintenance. Further, the admin device (124) may include functionality to: receive notifications, alerts, and/or recommendations from the telemetry analytics service (102) (or more specifically, the action invoker (110)); and, accordingly, submit commands and/or instructions to the host device environment (or more specifically, the resource and workload orchestrator (122)) based on the received notifications, alerts, and/or recommendations. One of ordinary skill will appreciate that the admin device (124) may perform other functionalities without departing from the scope of the invention. Examples of the admin device (124) may include, but are not limited to, a desktop computer, a laptop computer, a tablet computer, a server, a smartphone, or any other computing system similar to the exemplary computing system shown in FIG. 8.

While FIG. 1 shows a configuration of components, other system (100) configurations may be used without departing from the scope of the invention.

Figure 2A:
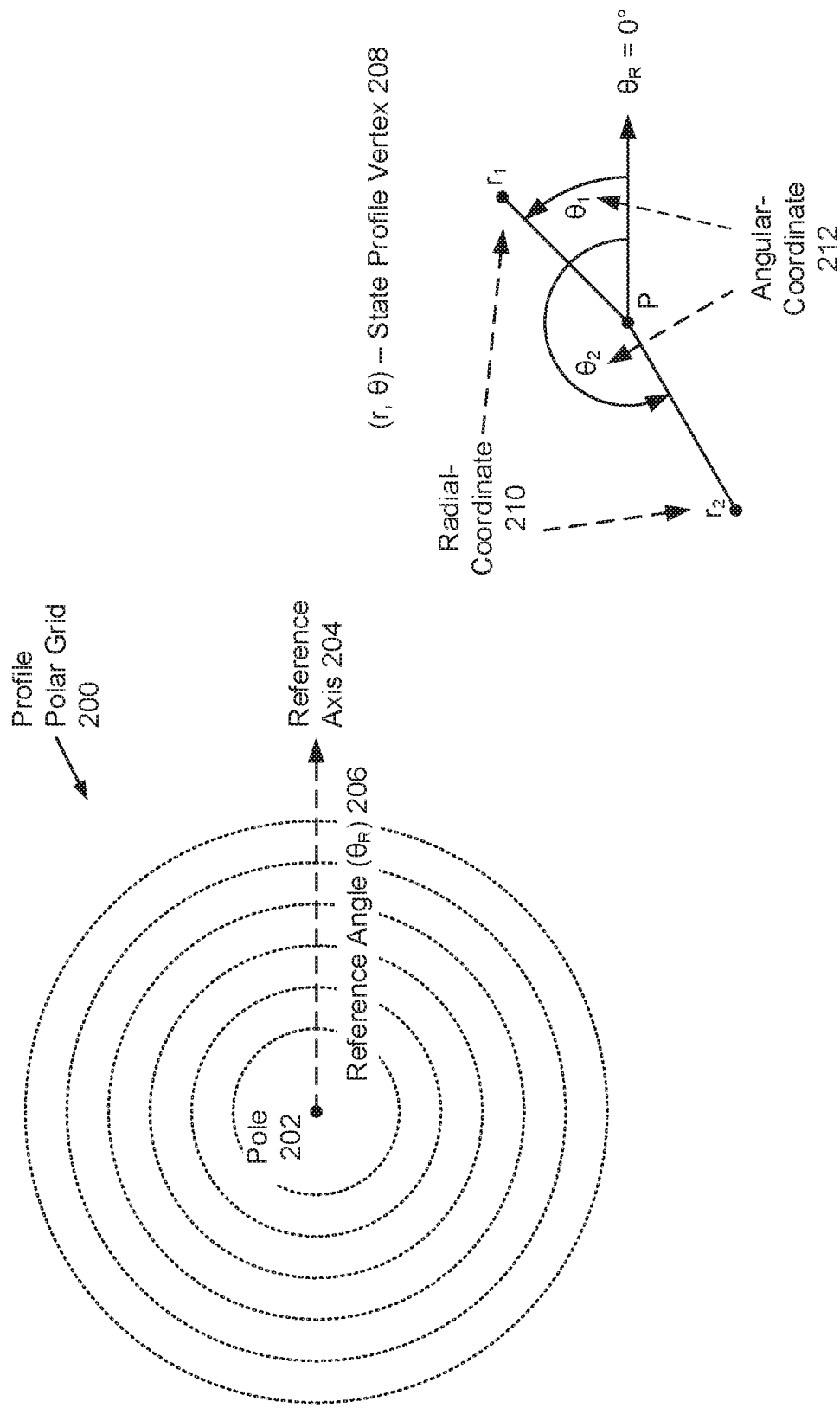
FIG. 2A shows a profile polar grid in accordance with one or more embodiments of the invention.

FIG. 2A shows a profile polar grid in accordance with one or more embodiments of the invention. The profile polar grid (200 may represent a planar canvas on which state profiles (described below) (see e.g., FIG. 2B) may be rendered. Specifically, the profile polar grid (200) may refer to a two-dimensional coordinate system (i.e., a polar coordinate system) that may be represented as a series of concentric circles, which radiate out from a pole (202) (or origin of the coordinate plane). Furthermore, the profile polar grid (200) may specify an imaginary reference axis (204) positioned at a reference angle (OR) (206) of zero degrees or radians, which stems outwardly from the pole (202).

In one embodiment of the invention, various state profile vertices (208) may be plotted on the profile polar grid (200), and subsequently connected, to form a given state profile (not shown). Each state profile vertex (208) may be represented by a polar coordinate (r, θ). The radial-coordinate (210), denoted by r, may refer to the linear distance or separation of the state profile vertex (208) from the pole (202) along an imaginary feature axis (not shown), where the imaginary feature axis may be respective to a given feature of the host device telemetry from which the state profile vertex (208) may be based. On the other hand, the angular-coordinate (212), denoted by θ, may refer to the angular separation of the aforementioned imaginary feature axis, on which the state profile vertex (208) may be plotted, from the reference axis (204).

Figure 2B:
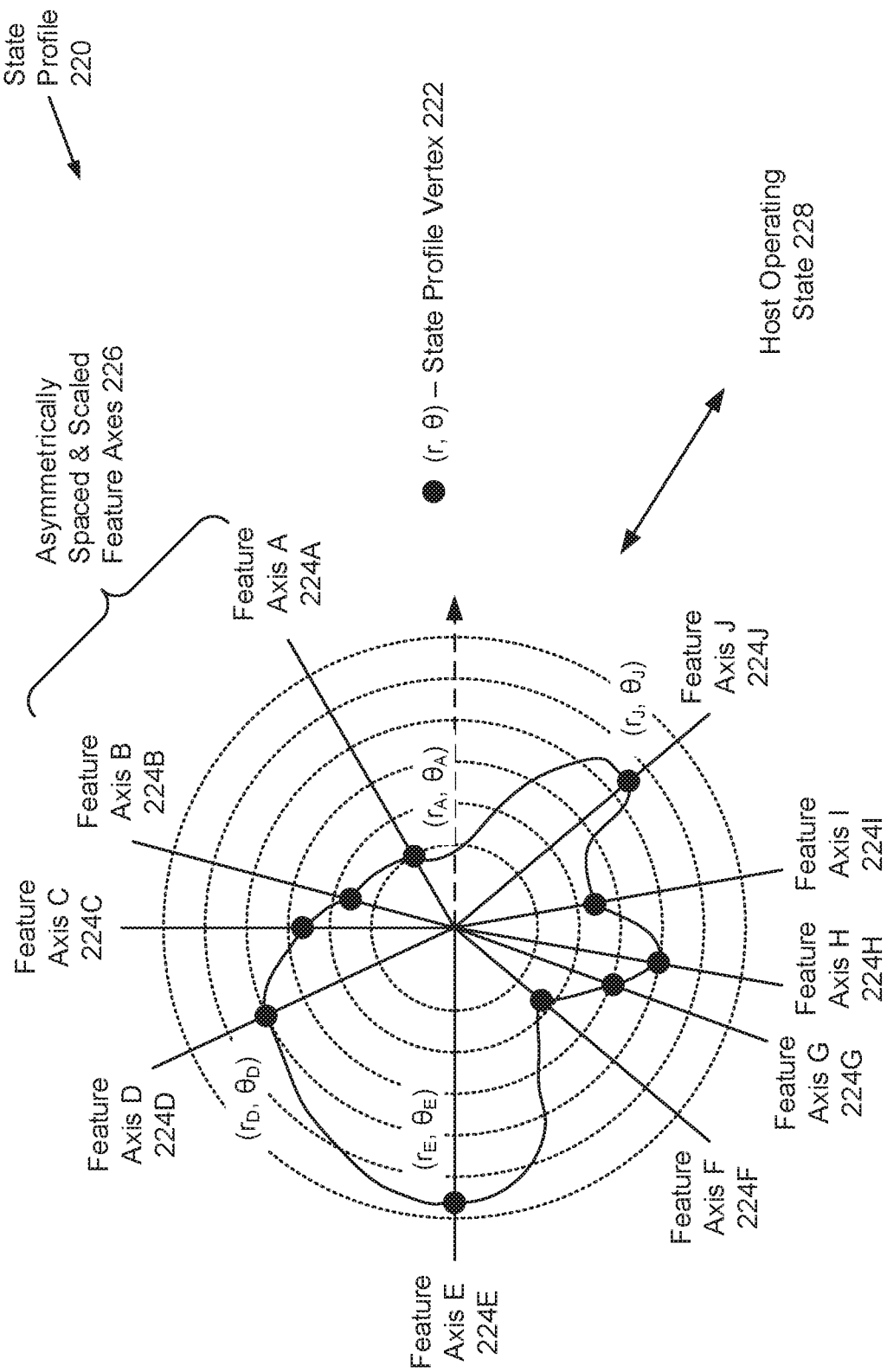
FIG. 2B shows an exemplary state profile in accordance with one or more embodiments of the invention.

FIG. 2B shows an exemplary state profile in accordance with one or more embodiments of the invention. Generally, the state profile (220) may refer to an interpolated, closed shape (e.g., a non-geometric shape) reflective of the operational state (i.e., host operational state (228)) of a given host device at a given point-in-time. The operational state of the given host device may be inferred from any subset of the host device telemetry aggregated from the given host device at the given point-in-time. Furthermore, the irregular and, ideally, distinguishable, contours of the state profile (220) may at least be contingent on the position of various state profile vertices (222) and an edge interpolation algorithm used to interpolate values, representative of each edge (or line) connecting side-by-side pairs of the state profile vertices (222).

In one embodiment of the invention, as mentioned above (see e.g., FIG. 2A), each state profile vertex (222) may represent a polar coordinate (r, θ) that may map onto a profile polar grid (shown but not labeled). Further, each state profile vertex (222) may, in part, reflect the weighted value (i.e., relative importance) of a given feature or indicator of the host device telemetry aggregated from the given host device, which may (along with a subset of other features) contribute most to inferring the correct operational state (i.e., target host operational state) of the given host device at the given point-in-time. Each state profile vertex (222), more specifically, may map onto an imaginary feature axis (224A-224J) respective to the given feature/indicator that which the state profile vertex (222) reflects. Moreover, the various imaginary feature axes (224A-224J) may be asymmetrically scaled and asymmetrically spaced (described below) (see e.g., FIGS. 3A and 3B).

Figure 3A:
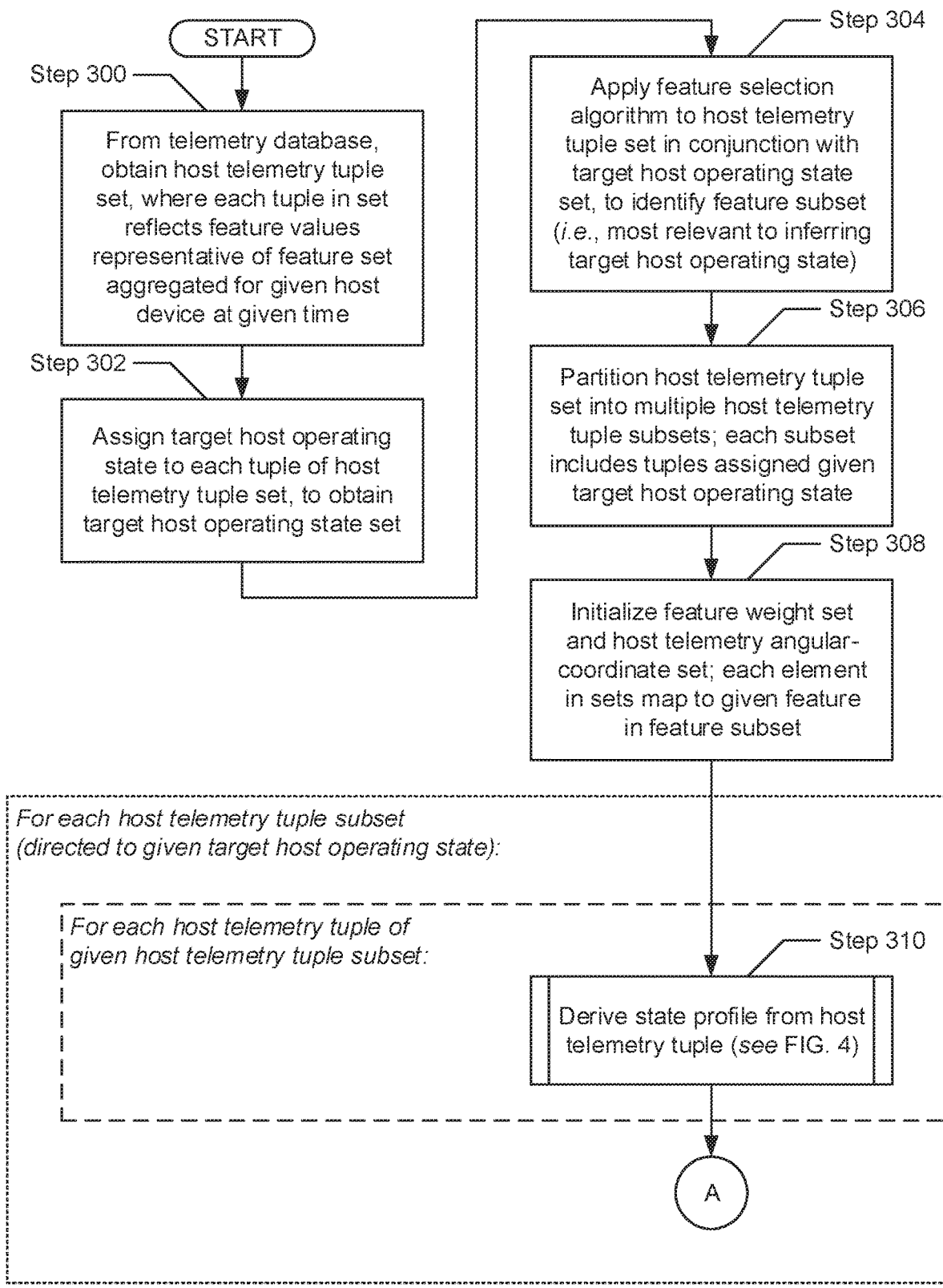
FIGS. 3A and 3B show flowcharts describing a method for processing host device telemetry in accordance with one or more embodiments of the invention.
Figure 3B:
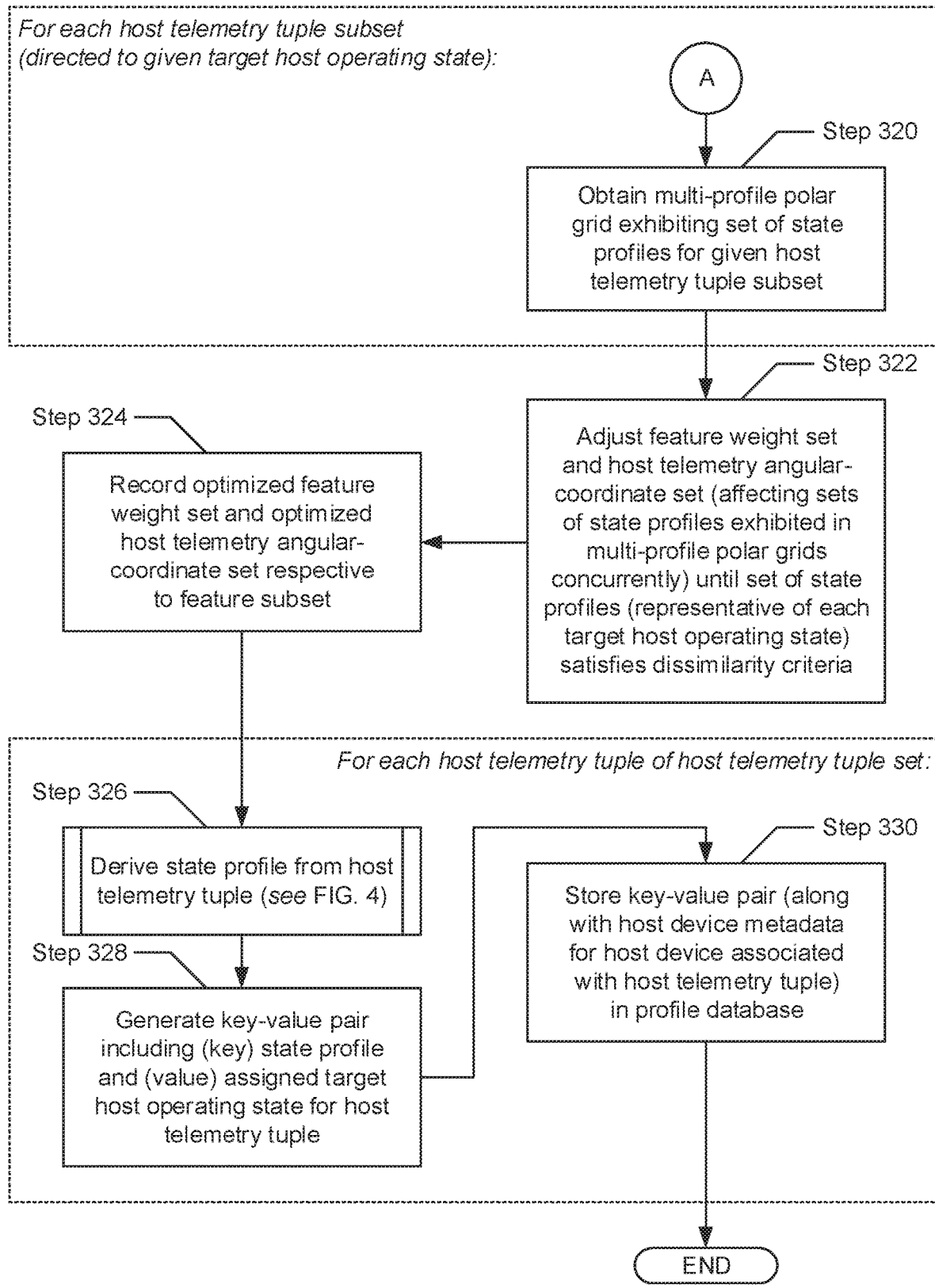

FIGS. 3A and 3B show flowcharts describing a method for processing host device telemetry in accordance with one or more embodiments of the invention. The various steps outlined below may be performed by the telemetry analytics service (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, a set of host telemetry tuples (i.e., a host telemetry set), including one or more host telemetry tuples, is obtained from the telemetry database (see e.g., FIG. 1). In one embodiment of the invention, each obtained host telemetry tuple may represent a collection (e.g., array or vector) of values, where each value may be reflective of a different feature (or indicator) pertinent to the status, configuration, or performance of a given host device for a given point-in-time. In turn, a feature (or indicator) may refer to an individual measurable property or attribute (e.g., metric, logged event, etc.) of the given host device, which may or may not infer the real-time operational (or operating) state of the given host device.

In Step 302, a target host operational state is assigned to each host telemetry tuple of the host telemetry tuple set (obtained in Step 300). In one embodiment of the invention, the target host operational state, relative to a given host telemetry tuple, may represent the true or actual operational state of a given host device (associated with the given host telemetry tuple) at the given point-in-time during which host device telemetry, captured by the given host telemetry tuple, had been aggregated. That is, by way of examples, a given host telemetry tuple may reflect values, respective to a collection of features or indicators, which may disclose that an associated host device is: operating normally, exhibiting high central processing unit (CPU) temperature, exhibiting high memory utilization, exhibiting high power consumption, experiencing high work or job loads, or any combination thereof. Furthermore, in one embodiment of the invention, the target host operational state assigned to a given host telemetry tuple may be determined by a subject matter expert (SME) (described above) (see e.g., FIG. 1). In another embodiment of the invention, the target host operational state assigned to a given host telemetry tuple may alternatively be determined by an artificial intelligence governed by, for example, a set of prescribed heuristics and/or adaptive machine learning.

In Step 304, a feature subset is identified. In one embodiment of the invention, the feature subset may represent a portion of the features or indicators, captured in the host device telemetry, which may contribute most to inferring the correct operational state (i.e., target host operational state) of any given host device. Identification of the feature subset may entail employing any existing feature selection algorithm—examples of which may include, but are not limited to, an extreme gradient boosting (XGB) feature selection algorithm, a light gradient boosting model (LGBM) feature selection algorithm, an extra tree feature selection algorithm, a decision tree feature selection algorithm, a gradient descent boost feature selection algorithm, an adaptive boosting (AdaBoost) feature selection algorithm, and a random forest feature selection algorithm.

In Step 306, the host telemetry tuple set (obtained in Step 300) is partitioned into multiple host telemetry tuple subsets. In one embodiment of the invention, each host telemetry tuple subset may include a collection of one or more host telemetry tuples, where each host telemetry tuple of the collection may be associated with a given target host operational state (assigned in Step 302). For example, across the host telemetry tuple set, ten different target host operational states (e.g., normal, high CPU temp., high memory use, high workload, high CPU temp. and memory use, high CPU temp. and workload, etc.) may be assigned. Accordingly, the host telemetry tuple set may be partitioned into ten host telemetry tuple subsets, where each host telemetry tuple subset may be directed to one of the assigned ten different target host operational states.

In Step 308, a set of feature weights (i.e., a feature weight set) and a set of host telemetry angular-coordinates (i.e., a host telemetry angular-coordinate set) are initialized. In one embodiment of the invention, the feature weight set may refer to a collection (e.g., array or vector) of weighting factors or weights, which may reflect the relative significance (to one another) of each feature, of the feature subset (identified in Step 304), towards visualizing state profiles (see e.g., FIG. 2B). Each element (i.e., weight) of the feature weight set may be applied, respectively, to a given element (i.e., feature value) of any given host telemetry tuple, thereby lowering, enhancing, or unchanging the relative importance of the feature value to which the weight may be applied.

Subsequently, in one embodiment of the invention, a given weight, of the feature weight set, may influence the radial distance between the pole and the state profile vertex (both described above) (see e.g., FIG. 2A), along the imaginary feature axis respective to the given feature to which the given weight may be applied, of a profile polar grid used to visualize the state profiles. A given weight, of the feature weight set, may also influence the scale in which values of a given feature may be represented along the imaginary feature axis respective to the given feature. Accordingly, a feature weight set specifying varying (i.e., non-uniform) weights, which may be assigned to the various features of the feature subset, respectively, may guarantee that the various imaginary feature axes are asymmetrically scaled— i.e., the units in which a given imaginary feature axis may be divided may vary depending on the weight respective to the given imaginary feature axis. Asymmetrically scaled feature axes may, at least in part, produce host operational state distinguishable state profiles. Moreover, any given weight of the feature weight set may be expressed as a positive real number (e.g., integers, fractions, decimals, or percentages greater than zero) and may be initialized to a numerical value denoting no change to the respective feature value and/or feature axis scale (e.g., integer 1, decimal 1.0, or percentage 100%).

In one embodiment of the invention, the host telemetry angular-coordinate set may refer to a collection (e.g., array or vector) of angular (or angle) values, expressed in degrees, radians, or any other existing unit that may measure the separation between a reference axis (described above) (see e.g., FIG. 2A) and one or more feature axes (described above) (see e.g., FIG. 2B) of a profile polar grid used to visualize state profiles. That is, each element (i.e., angular-coordinate) of the host telemetry angular-coordinate set may, respectively, establish an angular distance or separation between a given imaginary feature axis, for a given element (i.e., feature) of the feature subset, and the imaginary reference axis characteristic of any profile polar grid.

Accordingly, in one embodiment of the invention, a host telemetry angular-coordinate set specifying varying (i.e., non-uniform) angular-coordinates, which may be assigned to the various features of the feature subset, respectively, may guarantee that the various imaginary feature axes are asymmetrically spaced—i.e., the angular separation between the imaginary reference axis and a given imaginary feature axis may vary depending on the angular-coordinate respective to the given imaginary feature axis. Asymmetrically spaced feature axes may, at least in part, produce host operational state distinguishable state profiles. Moreover, any given angular-coordinate of the host telemetry angular-coordinate set may be expressed as a positive real number (e.g., integers, fractions, or decimals equal to or greater than zero) and may be initialized to a numerical value denoting that the various imaginary feature axes are equidistant from one another (e.g., integer 360 degrees divided by cardinality of features represented in feature subset, decimal 360.0 degrees or 6.28319 radians divided by cardinality of features represented in feature subset, etc.).

Hereinafter, a subset of the remaining steps—i.e., Steps 310 and 320 (see e.g., FIG. 3B)—may be performed for each host telemetry tuple subset (obtained in Step 306 through partitioning of the host telemetry tuple set (obtained in Step 300)). Further, of the aforementioned subset of remaining steps, Step 310 may be repeated for each host telemetry tuple forming the one or more host telemetry tuples of a given host telemetry tuple subset being considered. By way of a computer programming analogy, Step 310 may execute similar to a routine embedded in a nested loop (or a loop within a loop), where the inner loop iterates through the individual host telemetry tuples of a host telemetry tuple subset, and the outer loop iterates through the various host telemetry tuple subsets.

Proceeding along, in Step 310, a state profile (see e.g., FIG. 2B) is derived from a given host telemetry tuple (i.e., a current host telemetry tuple being processed) of a given host telemetry tuple subset (i.e., a current host telemetry tuple subset being considered) based, in part, on the feature weight set and host telemetry angular-coordinate set (initialized in Step 308). In one embodiment of the invention, the state profile may refer to an interpolated, closed shape (e.g., a non-geometric shape) reflective of the operational state of the host device with which the given host telemetry tuple may be associated. The irregular and, ideally, distinguishable, contours of the state profile may at least be contingent on the position of various state profile vertices (see e.g., FIGS. 2A and 2B) and an edge interpolation algorithm used to interpolate values, representative of each edge (or line) connecting side-by-side pairs of the state profile vertices. Derivation of the state profile is described in further detail below with respect to FIG. 4.

Turning to FIG. 3B, in Step 320, a multi-profile polar grid is obtained for the given host telemetry tuple subset (i.e., a current host telemetry tuple subset being considered) of the various host telemetry tuple subsets (obtained in Step 306). In one embodiment of the invention, the multi-profile polar grid may refer to a profile polar grid (see e.g., FIG. 2A) that shows multiple, overlapping state profiles. Each overlapping state profile may pertain to a given host telemetry tuple, of the given host telemetry tuple subset, which had been derived in Step 310. Further, the multi-profile polar grid may serve as a visualization aid, inviting the manipulation of the state profiles by a subject matter expert (SME) or an autonomous, artificial intelligence driven computer program, to obtain distinguishable, non-geometric shapes representative of the various unique target host operational states assigned across the host telemetry tuple set.

In Step 322, the feature weight set and the host telemetry angular-coordinate set (initialized in Step 308) are adjusted until a dissimilarity criteria is satisfied. In one embodiment of the invention, the feature weight set and the host telemetry angular-coordinate set may be adjusted with or without the aid of the multi-profile polar grid (obtained in Step 320). That is, the aforementioned sets may be adjusted with the aid of the multi-profile polar grid should a SME be performing the adjustments. On the other hand, the aforementioned sets may be adjusted with or without the aid of the multi-profile polar grid should the adjustments be performed by an autonomous computer program.

Furthermore, in one embodiment of the invention, adjustment of the individual weights of the feature weight set and the individual angular-coordinates of the host telemetry angular-coordinate set may alter the morphology (i.e., form, shape, etc.) of the various state profiles consistently throughout. The dissimilarity criteria (or objective(s) of the adjustments) may require that state profiles, respective to a same target host operational state, should be substantively similar to one another, while also requiring that state profiles, respective to different target host operational states, should be substantively dissimilar (or distinguishable) from one another. In one embodiment of the invention, the dissimilarity criteria may be implemented by way of visual confirmation when adustments to the aforementioned sets may be performed by a SME while interacting with a GUI and/or API published by the telemetry analytics service. In another embodiment of the invention, the dissimilarity criteria may alternatively be implemented using a set of adaptive rules or conditions followed, and while adjustments to the aforementioned sets may be performed, by an autonomous computer program. In the latter embodiment, the set of adaptive rules or conditions may intially be based on observations noted by a SME during early, manual manipulations of the state profiles thereby.

In Step 324, an optimized feature weight set and an optimized host telemetry angular-coordinate set are obtained and/or recorded. In one embodiment of the invention, the aforementioned, optimized sets may be obtained upon satisfaction of above-mentioned dissimilarity criteria (in Step 322), and may represent tuned weight and angular-coordinate values, respectively, which may infer distinguishable state profiles representative of varying target host operational states.

Hereinafter, the remaining steps—i.e., Steps 326, 328, and 330—may be performed for each host telemetry tuple of the host telemetry tuple set (obtained in Step 300). In Step 326, a state profile is derived from a given host telemetry tuple (i.e., a current host telemetry tuple being processed) of the host telemetry tuple set based, in part, on the optimized feature weight set and the optmized host telemetry angular-coordinate set (obtained in Step 324). Derivation of the state profile is described in further detail below with respect to FIG. 4.

In Step 328, a key-value pair is generated for the given host telemetry tuple (i.e., the current host telemetry tuple being processed) of the host telemetry tuple set. In one embodiment of the invention, a key-value pair (also referred herein as a complete key-value pair) may refer to an associative relationship mapping a given key to a given value. More specifically, the given key of a given key-value pair may take the form of the state profile (derived in Step 326) from the given host telemetry tuple. On the other hand, the given value of the given key-value pair may take the form of the target host operational state (assigned in Step 302) to the given host telemetry tuple.

In Step 330, the key-value pair (generated in Step 328), for the given host telemetry tuple, is subsequently stored in the profile database (see e.g., FIG. 1). In one embodiment of the invention, host device metadata may be stored alongside key-value pair. Host device metadata may include, for example, identification information—e.g., a unique name, a unique media access control (MAC) address, a unique Internet Protocol (IP) address, etc.—assigned to a given host device with which the key-value pair may be associated.

Figure 4:
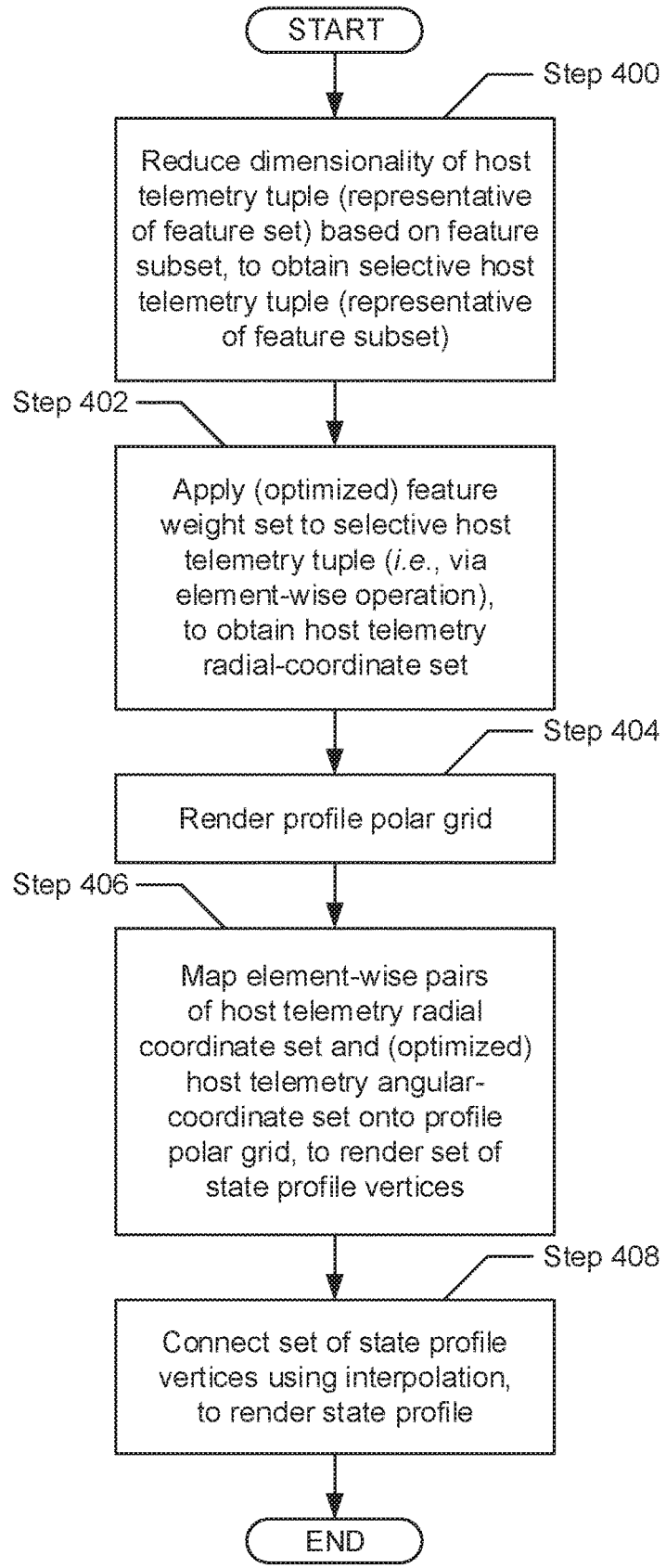
FIG. 4 shows a flowchart describing a method for rendering host device state profiles in accordance with one or more embodiments of the invention.

FIG. 4 shows a flowchart describing a method for rendering host device state profiles in accordance with one or more embodiments of the invention. The various steps outlined below may be performed by the telemetry analytics service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a dimensionality of a given host telemetry tuple is reduced based on a feature subset, to obtain a selective host telemetry tuple. In one embodiment of the invention, the selective host telemetry tuple may assume a reduced form of the given host telemetry tuple. More specifically, whereas the given host telemetry tuple may include a complete collection of values reflective of various features or indicators aggregated as host device telemetry for a given host device at a given point-in-time, the selective host telemetry tuple may alternatively include values, exhibited in the given host telemetry tuple, which may be representative of the portion of the features/indicators identified in the feature subset. For example, the given host telemetry tuple may reflect values directed to a first feature, a second feature, a third feature, a fourth feature, and a fifth feature. Further, the feature subset may identify the second and third features and, accordingly, the selective host telemetry tuple may reflect a reduced form of the given host telemetry tuple, which may retain the values respective to the second and third features.

In Step 402, an initialized (or optimized) feature weight set (described above) (see e.g., FIGS. 3A and 3B) is applied to the selective host telemetry tuple (obtained in Step 400). In one embodiment of the invention, application of the initialized (or optimized) feature weight set may entail performing an element-wise or element-by-element operation (i.e., product) between corresponding elements of the initialized (or optimized) feature weight set and the selective host telemetry tuple. As a result of the element-wise operation, a host telemetry radial-coordinate set may be obtained.

In Step 404, a profile polar grid (see e.g., FIG. 2A) is rendered. Thereafter, in Step 406, element-wise or element-by-element pairs of corresponding elements of the host telemetry radial-coordinate set (obtained in Step 402) and an initialized (or optmized) host telemetry angular-coordinate set (described above) (see e.g., FIGS. 3A and 3B) are mapped onto the profile polar grid (rendered in Step 404). In one embodiment of the invention, each element-wise pair may represent a given state profile vertex (r, θ), where r references the host telemetry radial-coordinate and θ references the host telemetry angular-coordinate of the element-wise pair.

In Step 408, the multiple state profile vertices (plotted onto the rendered profile polar grid in Step 406) are subsequently connected to visualize or render a state profile. As mentioned above, in one embodiment of the invention, the state profile may refer to an interpolated, closed shape (e.g., a non-geometric shape) reflective of the operational state of the host device with which the selective host telemetry tuple (obtained in Step 400) may be associated. The irregular and, ideally, distinguishable, contours of the state profile may at least be contingent on the position of the various state profile vertices and an edge interpolation algorithm used to interpolate values, representative of each edge (or line) connecting side-by-side pairs of the state profile vertices. The various state profile vertices may be connected using any existing edge interpolation algorithm.

Figure 5:
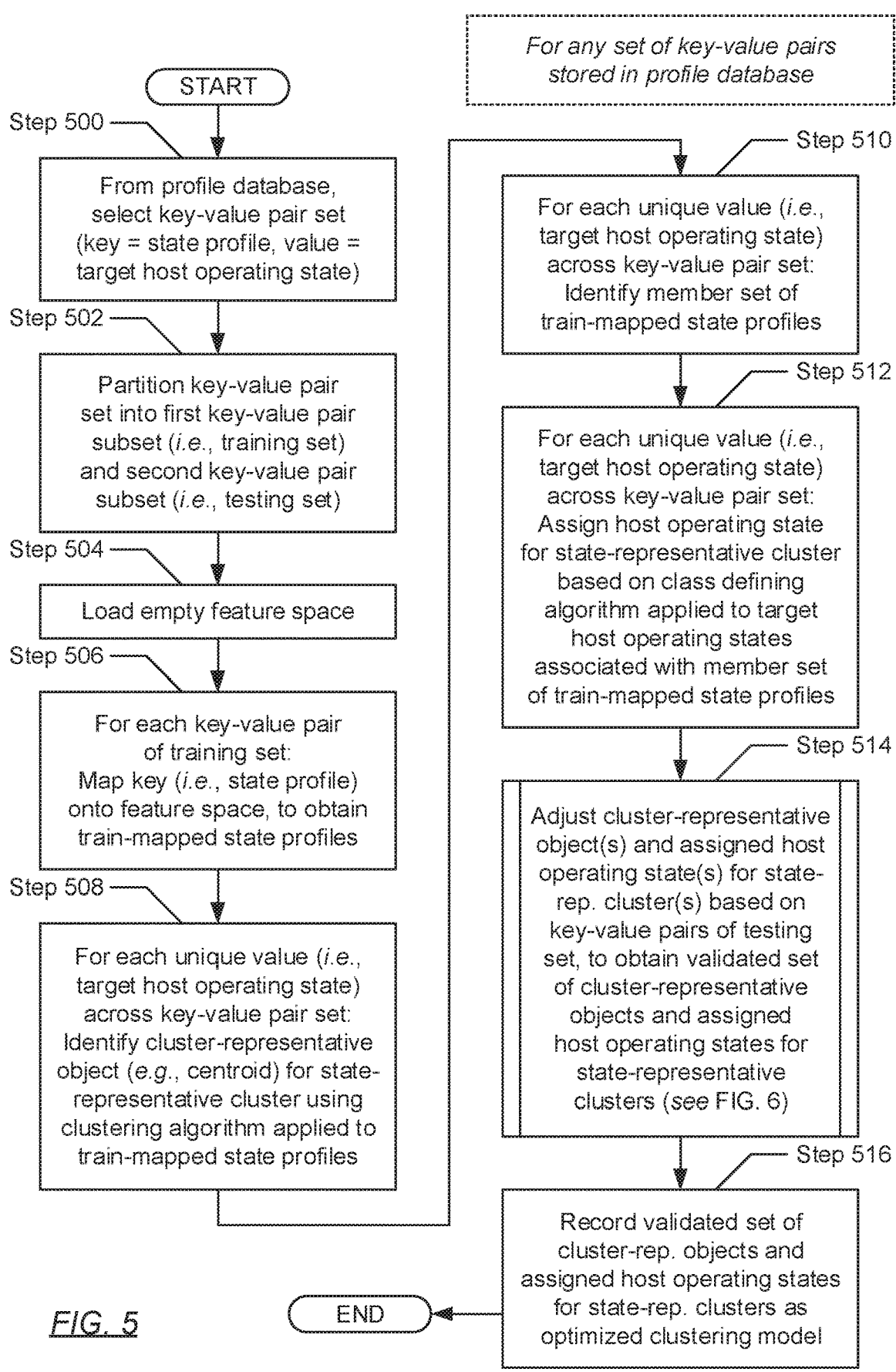
FIG. 5 shows a flowchart describing a method for optimizing a clustering model in accordance with one or more embodiments of the invention.

FIG. 5 shows a flowchart describing a method for optimizing a clustering model in accordance with one or more embodiments of the invention. The various steps outlined below may be performed by the telemetry analytics service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, the various steps to be outlined below may be performed for any set of multiple complete key-value pairs stored in the profile database (see e.g., FIG. 1). In one embodiment of the invention, a complete key-value pair may refer to a key-value pair that includes both the key portion and the value portion (described below).

Accordingly, in Step 500, a set of complete key-value pairs (i.e., a complete key-value pair set) is selected from the profile database. In one embodiment of the invention, each complete key-value pair may refer to an associative relationship mapping a given key to a given value. More specifically, the given key of a given key-value pair may take the form of a state profile (described above) (see e.g., FIG. 2B) derived for a given host device based on host device telemetry collected at a given time. On the other hand, the given value of the given key-value pair may take the form of a target host operational state—i.e., a numerical or categorical value reflecting an operational state (e.g., normal, high memory utilization, high CPU temperature, high power consumption, any combination thereof, etc.) of the given host device, which may be ascertained from or relative to the host device telemetry collected at the given time.

In Step 502, the complete key-value pair set (selected in Step 500) is partitioned into two complete key-value pair subsets. In one embodiment of the invention, a first complete key-value pair subset may include a first portion of a cardinality (or number) of complete key-value pairs in the complete key-value pair set, whereas a second complete key-value pair subset may include a second portion (or remainder) of the cardinality of complete key-value pairs in the complete key-value pair set. Further, the first complete key-value pair subset may also be referred herein as a training set, while the second complete key-value pair subset may also be referred herein as a testing set.

In one embodiment of the invention, the ratio of complete key-value pairs forming the training set to complete key-value pairs forming the testing set may be determined based on telemetry analytics service administrator preferences. Specifically, the aforementioned preferences may include a parameter—e.g., a percentage of data for training (PDT) parameter—expressed through a numerical value that specifies the percentage of the complete key-value pair set should be used for training, versus testing, a clustering model.

In Step 504, an empty feature space is loaded. In one embodiment of the invention, a feature space may refer to an N-dimensional coordinate space onto which state profiles may be mapped, where N represents the cardinality (i.e., number) of the subset of features conveyed in the state profiles. Further, an empty feature space may refer to an initialized feature space that excludes any state profiles mapped thereon.

In Step 506, the key (i.e., state profile) of each complete key-value pair, of the training set (obtained in Step 502), is mapped onto the empty feature space (loaded in Step 504). Specifically, in one embodiment of the invention, a profile-representative object may be determined and, subsequently, mapped onto the N-dimensional feature space. Further, the profile-representative object may be derived from statistical analyses entailing the various state profile vertices (see e.g., FIGS. 2A and 2B) forming a given state profile. By way of an example, the profile-representative object for a given key (or state profile) may be expressed by a data-point (e.g., state profile vertex) mean or average of the various state profile vertices for the given state profile. Moreover, in one embodiment of the invention, each aforementioned key, while mapped onto the empty feature space, may be referred hereinafter as a train-mapped state profile.

In Step 508, one or more cluster-representative objects is/are identified. In one embodiment of the invention, a cluster-representative object may refer to any (N−1)-dimensional object that may be used to represent a cluster of substantively similar state profiles mapped onto the N-dimensional feature space (e.g., the train-mapped state profiles obtained in Step 506). Examples of a cluster-representative object may include, but are not limited to, a point (i.e., zero-dimensional object) (e.g., a centroid, mediod, etc.), a line (i.e., one-dimensional object), a plane (i.e., two-dimensional object), and so forth. Furthermore, a cluster-representative object may be identified for each unique value (i.e., target host operational state) exhibited across the complete key-value pair set (selected in Step 500). Any cluster of substantively similar state profiles, mapped onto the feature space (loaded in Step 504) and directed to a common target host operational state, may be referred hereinafter as a state-representative cluster. Moreover, identification of the cluster-representative object(s) may entail using any existing clustering algorithm (e.g., representative object based algorithms, density based algorithms, distribution based algorithms, graph based algorithms, connectivity based algorithms, etc.) that may be applied to the train-mapped state profiles.

In Step 510, a member set of train-mapped state profiles, for each unique value (i.e., target host operational state) exhibited across the complete key-value pair set (selected in Step 500), is identified. That is, in one embodiment of the invention, each train-mapped state profile (obtained in Step 506) may be assigned to a given member set, respective to a given target host operational state, based on the value portion of the complete key-value pair with which the train-mapped state profile may be associated.

In Step 512, a predicted host operational state, for each state-representative cluster (identified in Step 508), is assigned thereto. In one embodiment of the invention, the predicted host operational state for a given state-representative cluster may be assigned based on a class-defining algorithm (e.g., the k-nearest-neighbor algorithm, the mean-shift algorithm, the density-based spatial clustering of applications with noise (DBSCAN) algorithm, etc.), which may derive the predicted host operational state from an examination of the one or more target host operational states associated with the member set of train-mapped state profiles (identified in Step 510) for the given state-representative cluster.

In Step 514, the cluster-representative object(s) (identified in Step 508) and the predicted host operational state(s) (assigned to each state-representative cluster in Step 512) are adjusted. In one embodiment of the invention, the adjustments may rely on the mapping of keys (i.e., state profiles), of the complete key-value pairs partitioned into the testing set (obtained in Step 502), onto the training set populated feature space. The aforementioned adjustments are described in further detail below with respect to FIG. 6. Furthermore, upon completion of the adjustments, a validated set of cluster-representative objects and, similarly, a validated set of predicted host operational states, for each state-representative cluster, may be obtained.

In Step 516, the validated sets of cluster-representative objects and predicted host operational states (obtained in Step 514), for each state-representative cluster (identified in Step 508), are subsequently recorded. In one embodiment of the invention, these validated sets may be recorded as parameters defining an optimized clustering model.

Figure 6:
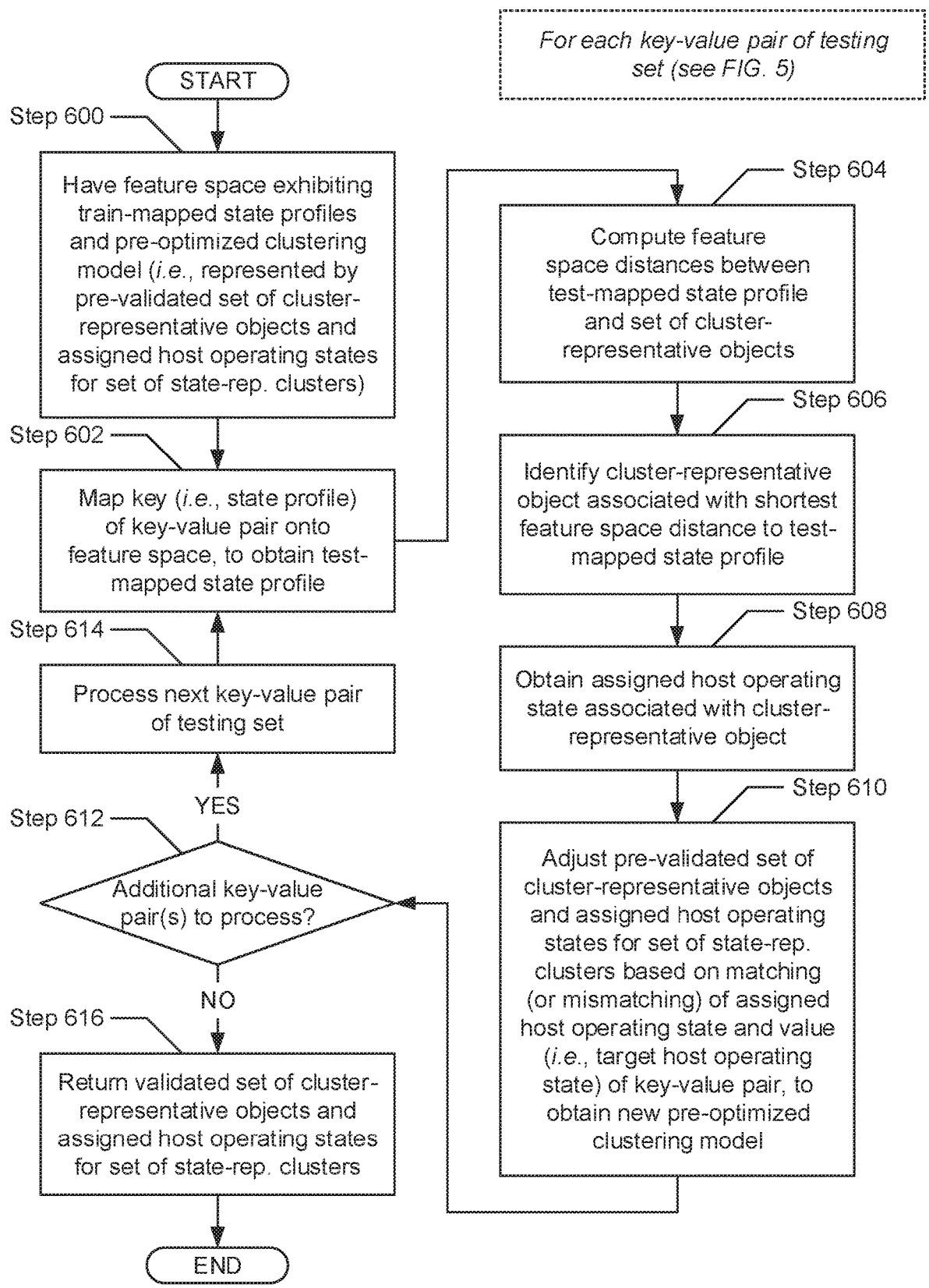
FIG. 6 shows a flowchart describing a method for validating a clustering model in accordance with one or more embodiments of the invention.

FIG. 6 shows a flowchart describing a method for validating a clustering model in accordance with one or more embodiments of the invention. The various steps outlined below may be performed by the telemetry analytics service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 6, the various steps to outlined below may be performed for each complete key-value pair of an identified testing set (described above) (see e.g., FIG. 5).

Accordingly, in Step 600, it is assumed that a populated feature space is available. In one embodiment of the invention, the populated feature space may exhibit multiple train-mapped state profiles (described above) (see e.g., FIG. 5) and parameters defining a pre-optimized clustering model. The parameters, defining the pre-optimized clustering model, may include a pre-validated set of cluster-representative objects and a pre-validated set of predicted host operational states, for a set of state-representative clusters (all described above) (see e.g., FIG. 5).

In Step 602, the key portion (i.e., state profile (see e.g., FIG. 2B)) of a given complete key-value pair (i.e., a current complete key-value pair being processed) is mapped onto the populated feature space (mentioned in Step 600). Specifically, in one embodiment of the invention, a profile-representative object may be determined and, subsequently, mapped onto the N-dimensional feature space. Further, the profile-representative object may be derived from statistical analyses entailing the various state profile vertices (see e.g., FIGS. 2A and 2B) forming a given state profile. By way of an example, the profile-representative object for a given key (or state profile) may be expressed by a data-point (e.g., state profile vertex) mean or average of the various state profile vertices for the given state profile. Moreover, in one embodiment of the invention, the aforementioned key, while mapped onto the populated feature space, may be referred hereinafter as a test-mapped state profile.

In Step 604, a set of feature space distances between the test-mapped state profile (obtained in Step 602) and the pre-validated set of cluster-representative objects (mentioned in Step 600), respectively, is computed. In one embodiment of the invention, each feature space distance may refer to a distance metric between two objects—i.e., the test-mapped state profile and a given pre-validated cluster-representative object—residing in the N-dimensional feature space. Examples of employable distance metrics may include, but are not limited to, the Euclidean distance metric, the Manhattan distance metric, the Chebychev distance metric, the Spearman distance metric, the Minkowski distance metric, etc.

In Step 606, a nearest cluster-representative object, of the pre-validated set of cluster-representative objects (mentioned in Step 600), is identified. Specifically, in one embodiment of the invention, the nearest cluster-representative object may represent a pre-validated cluster-representative object that resides closest to the test-mapped state profile in the populated feature space, or may be associated with the shortest feature space distance (of the set of feature space distances computed in Step 604).

In Step 608, of the pre-validated set of predicted host operational states (mentioned in Step 600), the predicted host operational state—corresponding to the nearest cluster-representative object (identified in Step 606)—is obtained. Thereafter, in Step 610, the pre-validated sets of cluster-representative objects and predicted host operational states, for the set of state-representative clusters, are adjusted. In one embodiment of the invention, the adjustments may be based on a matching (or mismatching) of the predicted host operational state for the test-mapped state profile (obtained in Step 608) against the target host operational state for the test-mapped state profile (obtained from the value portion of the given complete key-value pair). Further, the adjustments may result in the re-selection (or re-identification) of zero or more cluster-representative objects and/or zero or more predicted host operational states for the above-mentioned set of state-representative clusters. Following these adjustments (if any), a new pre-optimized clustering model, defined through the adjusted set of cluster-representative objects and predicted host operational states, may be obtained.

In Step 612, a determination is made as to whether any additional complete key-value pairs, identified into the above-mentioned testing set (see e.g., FIG. 5), remains to be processed. In one embodiment of the invention, if it is determined that at least one other complete key-value pair remains to be processed, then the process proceeds to Step 614. On the other hand, in another embodiment of the invention, if it is alternatively determined that no additional complete key-value pairs remain to be processed, then the process alternatively proceeds to Step 616.

In Step 614, after determining (in Step 612) that at least one other complete key-value pair, identified into the above-mentioned testing set, remains to be processed, a next complete key-value pair is processed. Specifically, in one embodiment of the invention, processing of the next complete key-value pair may entail repeating the outlined method starting from Step 602.

In Step 616, after alternatively determining (in Step 612) that no additional complete key-value pairs, identified into the above-mentioned testing set, remains to be processed, validated sets of the cluster-representative objects and the predicted host operational states, for the set of state-representative clusters, is returned.

Figure 7:
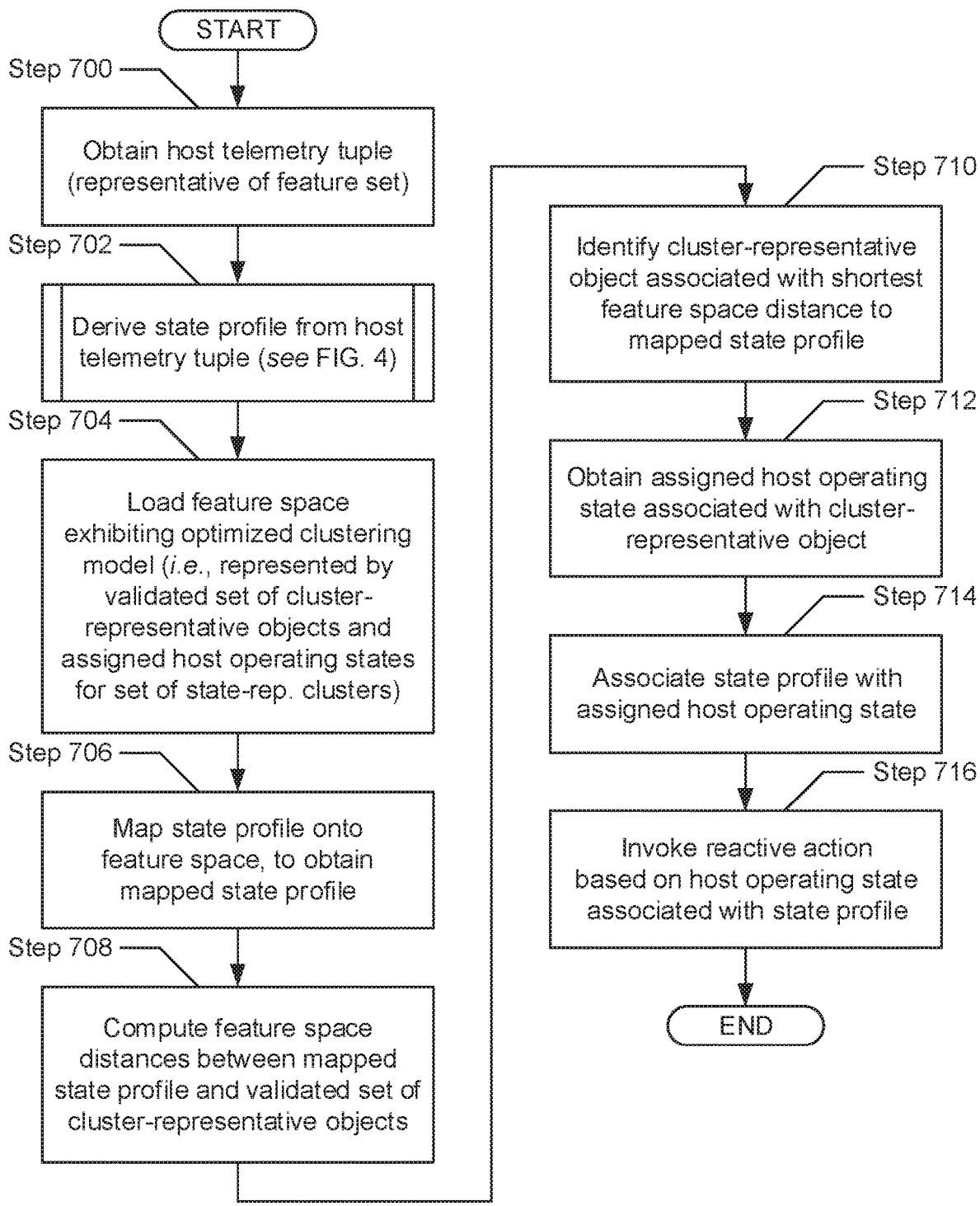
FIG. 7 shows a flowchart describing a method for classifying host operational states in accordance with one or more embodiments of the invention.

FIG. 7 shows a flowchart describing a method for classifying host operational states in accordance with one or more embodiments of the invention. The various steps outlined below may be performed by the telemetry analytics service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 7, in Step 700, a host telemetry tuple is obtained. In one embodiment of the invention, the host telemetry tuple may represent a collection (e.g., array or vector) of values, where each value may be reflective of a different feature (or indicator) pertinent to the status, configuration, or performance of a given host device for a given point-in-time. In turn, a feature (or indicator) may refer to an individual measurable property or attribute (e.g., metric, logged event, etc.) of the given host device, which may or may not infer the real-time operational (or operating) state of the given host device.

In Step 702, a state profile (see e.g., FIG. 2B) is derived from at least a subset of the host telemetry tuple (obtained in Step 700). In one embodiment of the invention, the state profile may be derived based, in part, on an optimized feature weight set and an optimized host telemetry angular-coordinate set (described above) (see e.g., FIGS. 3A and 3B). Furthermore, derivation of the state profile is described in further detail above with respect to FIG. 4.

In Step 704, a feature space, which exhibits parameters defining an optimized clustering model, is loaded. In one embodiment of the invention, the feature space may refer to an N-dimensional coordinate space onto which state profiles (including the state profile (derived in Step 702)) may be mapped, where N represents the cardinality (i.e., number) of the subset of features conveyed in the state profiles. Further, the optimized clustering model may refer to a clustering model, which may have been tuned through supervised learning—i.e., learning (or optimization) through the analyses of training and testing examples and/or data. Moreover, the parameters, defining the optimized clustering model, may include a validated set of cluster-representative objects and a validated set of predicted host operational states for a set of state-representative clusters, respectively.

In Step 706, the state profile (derived in Step 702) is subsequently mapped onto the feature space (loaded in Step 704). Specifically, in one embodiment of the invention, a profile-representative object may be determined and, subsequently, mapped onto the N-dimensional feature space. Further, the profile-representative object may be derived from statistical analyses entailing the various state profile vertices (see e.g., FIGS. 2A and 2B) forming a given state profile. By way of an example, the profile-representative object for a given key (or state profile) may be expressed by a data-point (e.g., state profile vertex) mean or average of the various state profile vertices for the given state profile. Moreover, in one embodiment of the invention, the state profile, while mapped onto the feature space, may be referred hereinafter as a mapped state profile.

In Step 708, a set of feature space distances between the mapped state profile (obtained in Step 706) and the validated set of cluster-representative objects (loaded in Step 704), respectively, is computed. In one embodiment of the invention, each feature space distance may refer to a distance metric between two objects—i.e., the mapped state profile and a given validated cluster-representative object—residing in the N-dimensional feature space. Examples of employable distance metrics may include, but are not limited to, the Euclidean distance metric, the Manhattan distance metric, the Chebychev distance metric, the Spearman distance metric, the Minkowski distance metric, etc.

In Step 710, a nearest cluster-representative object, of the validated set of cluster-representative objects (loaded in Step 704), is identified. Specifically, in one embodiment of the invention, the nearest cluster-representative object may represent a validated cluster-representative object that resides closest to the mapped state profile in the feature space, or may be associated with the shortest feature space distance (of the set of feature space distances computed in Step 708).

In Step 712, of the validated set of predicted host operational states (in part defining the optimized clustering model loaded in Step 704), the predicted host operational state— corresponding to the nearest cluster-representative object (identified in Step 710)—is obtained. Thereafter, in Step 714, the predicted host operational state (obtained in Step 712) is assigned to or associated with the state profile (derived in Step 702) (and, accordingly, the above-mentioned given host device represented through the state profile for a given point-in-time).

In Step 716, a reactive action is invoked based on the predicted host operational state (associated with the state profile and given host device in Step 714). In one embodiment of the invention, the reactive action may entail issuing a notification and/or an alert, indicative of the predicted host operational state associated with the given host device, to the resource and workload orchestrator and/or the admin device (see e.g., FIG. 1). In another embodiment of the invention, the reactive action may entail issuing a recommendation, addressing or rectifying the predicted host operational state associated with the given host device, to the resource and workload orchestrator and/or the admin device. In the latter embodiment, the recommendation may entail: (a) the changing of one or more operational and/or configuration parameters governing the behavior of the given host device; (b) the shifting of one or more workloads to be instantiated onto the given host device from one or more other host devices, or workloads to be offloaded from the given host device to one or more other host devices; and (c) the allocation or deallocation of resources (e.g., computer processors, memory, storage, virtualization, network bandwidth, etc.) available on the given host device in support of one or more existing workloads executing thereon. Moreover, to address or rectify the predicted host operational state associated with the given host device, the objective of a given recommendation may be directed to returning (if feasible) the real-time operational state of the given host device to a host operational state nearest, if not matching, a normal or nominal operational state.

Figure 8:
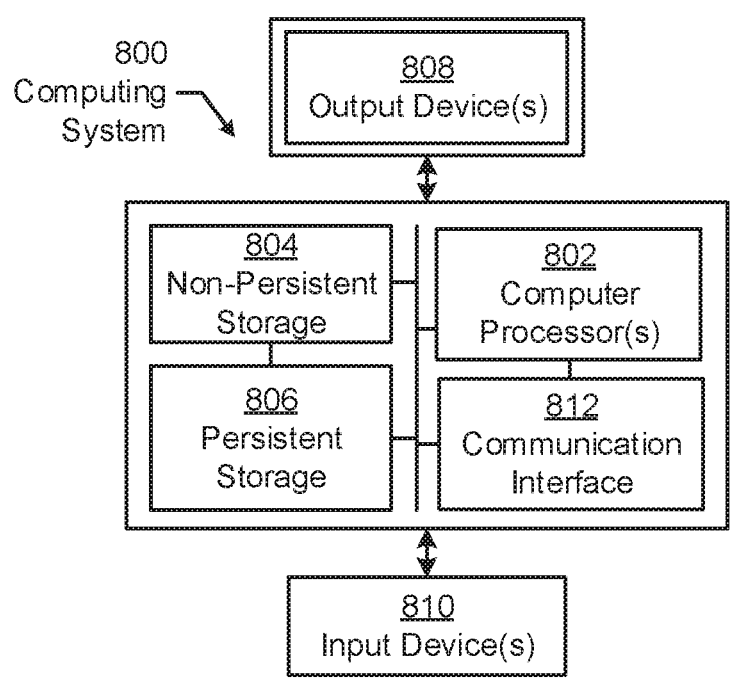
FIG. 8 shows an exemplary computing system in accordance with one or more embodiments of the invention.

FIG. 8 shows an exemplary computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a central processing unit (CPU) and/or a graphics processing unit (GPU). The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operational state classification of host devices, comprising:
   loading a feature space comprising a set of cluster-representative objects;
   deriving a first state profile from host device telemetry for a first host device;
   mapping the first state profile onto the feature space, to obtain a first mapped state profile;
   identifying a first cluster-representative object of the set of cluster-representative objects based on a first set of proximities between the first mapped state profile and the set of cluster-representative objects;
   associating, with the first state profile, a first host operational state assigned to the first cluster-representative object; and
   invoking, based on the first host operational state, a first reactive action targeting the first host device.

2. The method of claim 1, wherein deriving the first state profile, comprises:
   obtaining host telemetry angular-coordinates for a feature subset of the host device telemetry;
   reducing, based on the feature subset, a dimensionality of the host device telemetry to obtain selective host device telemetry for the first host device;
   applying feature weights to the selective host device telemetry, to obtain host telemetry radial-coordinates;
   mapping the host telemetry radial-coordinates and the host telemetry angular-coordinates onto a profile polar grid, to render a set of state profile vertices; and
   connecting the set of state profile vertices to derive the first state profile.

3. The method of claim 1, wherein the first reaction action targeting the first host device comprises one selected from a group consisting of issuing a first recommendation to an orchestrator, issuing the first recommendation to an admin device, issuing a second recommendation to the orchestrator, issuing the second recommendation to the admin device, issuing a third recommendation to the orchestrator, and issuing the third recommendation to the admin device.

4. The method of claim 3, wherein the first recommendation comprises one selected from another group consisting of changing at least one operational parameter governing a behavior of the first host device, and changing at least one configuration parameter governing the behavior of the first host device.

5. The method of claim 3, wherein the second recommendation comprises one selected from another group consisting of importing at least one workload onto the first host device from a second host device, and offloading at least one workload from the first host device onto the second host device.

6. The method of claim 3, wherein the third recommendation comprises one selected from another group consisting of allocating resources to support at least one workload executing on the first host device, and deallocating resources from supporting at least one workload executing on the first host device.

7. The method of claim 1, further comprising:
   deriving a second state profile from host device telemetry for the first host device;
   mapping the second state profile onto the feature space, to obtain a second mapped state profile;
   identifying a second cluster-representative object of the set of cluster-representative objects based on a second set of proximities between the second mapped state profile and the set of cluster-representative objects;
   associating, with the second state profile, a second host operational state assigned to the second cluster-representative object; and
   invoking, based on the second host operational state, a second reactive action targeting the first host device.

8. The method of claim 1, further comprising:
   deriving a second state profile from host device telemetry for a second host device;
   mapping the second state profile onto the feature space, to obtain a second mapped state profile;
   identifying the first cluster-representative object of the set of cluster-representative objects based on a second set of proximities between the second mapped state profile and the set of cluster-representative objects;
   associating, with the second state profile, the first host operational state assigned to the first cluster-representative object; and
   invoking, based on the first host operational state, the first reactive action targeting the second host device.

9. The method of claim 1, further comprising:
   deriving a second state profile from host device telemetry for a second host device;
   mapping the second state profile onto the feature space, to obtain a second mapped state profile;
   identifying a second cluster-representative object of the set of cluster-representative objects based on a second set of proximities between the second mapped state profile and the set of cluster-representative objects;
   associating, with the second state profile, a second host operational state assigned to the second cluster-representative object; and
   invoking, based on the second host operational state, a second reactive action targeting the second host device.

10. A non-transitory computer readable medium (CRM) comprising computer readable program code, which when executed by a computer processor, enables the computer processor to:
    load a feature space comprising a set of cluster-representative objects;
    derive a first state profile from host device telemetry for a first host device;
    map the first state profile onto the feature space, to obtain a first mapped state profile;
    identify a first cluster-representative object of the set of cluster-representative objects based on a first set of proximities between the first mapped state profile and the set of cluster-representative objects;
    associate, with the first state profile, a first host operational state assigned to the first cluster-representative object; and
    invoke, based on the first host operational state, a first reactive action targeting the first host device.

11. The non-transitory CRM of claim 10, comprising computer readable program code directed to deriving the first state profile, which when executed by the computer processor, further enables the computer processor to:
    obtain host telemetry angular-coordinates for a feature subset of the host device telemetry;
    reduce, based on the feature subset, a dimensionality of the host device telemetry to obtain selective host device telemetry for the first host device;
    apply feature weights to the selective host device telemetry, to obtain host telemetry radial-coordinates;
    map the host telemetry radial-coordinates and the host telemetry angular-coordinates onto a profile polar grid, to render a set of state profile vertices; and connect the set of state profile vertices to derive the first state profile.

12. The non-transitory CRM of claim 10, wherein the first reaction action targeting the first host device comprises one selected from a group consisting of issuing a first recommendation to an orchestrator, issuing the first recommendation to an admin device, issuing a second recommendation to the orchestrator, issuing the second recommendation to the admin device, issuing a third recommendation to the orchestrator, and issuing the third recommendation to the admin device.

13. The non-transitory CRM of claim 12, wherein the first recommendation comprises one selected from another group consisting of changing at least one operational parameter governing a behavior of the first host device, and changing at least one configuration parameter governing the behavior of the first host device.

14. The non-transitory CRM of claim 12, wherein the second recommendation comprises one selected from another group consisting of importing at least one workload onto the first host device from a second host device, and offloading at least one workload from the first host device onto the second host device.

15. The non-transitory CRM of claim 12, wherein the third recommendation comprises one selected from another group consisting of allocating resources to support at least one workload executing on the first host device, and deallocating resources from supporting at least one workload executing on the first host device.

16. The non-transitory CRM of claim 10, comprising computer readable program code, which when executed by the computer processor, further enables the computer processor to:
derive a second state profile from host device telemetry for the first host device;
map the second state profile onto the feature space, to obtain a second mapped state profile;
identify a second cluster-representative object of the set of cluster-representative objects based on a second set of proximities between the second mapped state profile and the set of cluster-representative objects;
associate, with the second state profile, a second host operational state assigned to the second cluster-representative object; and
invoke, based on the second host operational state, a second reactive action targeting the first host device.

17. The non-transitory CRM of claim 10, comprising computer readable program code, which when executed by the computer processor, further enables the computer processor to:
derive a second state profile from host device telemetry for a second host device;
mapp the second state profile onto the feature space, to obtain a second mapped state profile;
identify the first cluster-representative object of the set of cluster-representative objects based on a second set of proximities between the second mapped state profile and the set of cluster-representative objects;
associate, with the second state profile, the first host operational state assigned to the first cluster-representative object; and
invoke, based on the first host operational state, the first reactive action targeting the second host device.

18. The non-transitory CRM of claim 10, comprising computer readable program code, which when executed by the computer processor, further enables the computer processor to:
derive a second state profile from host device telemetry for a second host device;
map the second state profile onto the feature space, to obtain a second mapped state profile;
identify a second cluster-representative object of the set of cluster-representative objects based on a second set of proximities between the second mapped state profile and the set of cluster-representative objects;
associate, with the second state profile, a second host operational state assigned to the second cluster-representative object; and
invoke, based on the second host operational state, a second reactive action targeting the second host device.

19. A system, comprising:
a telemetry analytics service comprising a computer processor configured to:
load a feature space comprising a set of cluster-representative objects;
derive a state profile from host device telemetry for a host device;
map the state profile onto the feature space, to obtain a mapped state profile;
identify a cluster-representative object of the set of cluster-representative objects based on a set of proximities between the mapped state profile and the set of cluster-representative objects;
associate, with the state profile, a host operational state assigned to the cluster-representative object; and
invoke, based on the host operational state, a reactive action targeting the host device.

20. The system of claim 19, further comprising:
a telemetry database operatively connected to the telemetry analytics service and a plurality of host devices comprising the host device,
wherein the plurality of host devices each consolidate host device telemetry onto the telemetry database periodically.

* * * * *